US012752560B2

(12) United States Patent

Kato et al.

(10) Patent No.: US 12,752,560 B2

(45) Date of Patent: Oct. 6, 2026

(54) PRINTING DEVICE INCLUDING BATTERY TRAY ATTACHABLE TO BATTERY ACCOMMODATING PORTION OF HOUSING AND HAVING MOUNTING SURFACE CONFIGURED TO SUPPORT BATTERY

(71) Applicant: BROTHER KOGYO KABUSHIKI KAISHA, Nagoya (JP)

(72) Inventors: Yushi Kato, Nagoya (JP); Hikaru Iino, Niwa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 91 days.

(21) Appl. No.: 18/894,266

(22) Filed: Sep. 24, 2024

(65) Prior Publication Data

US 2025/0108652 A1 Apr. 3, 2025

(30) Foreign Application Priority Data

Sep. 29, 2023 (JP) ................................ 2023-169268

(51) Int. Cl.
*B41J 29/393* (2006.01)

(52) U.S. Cl.
CPC .................................. *B41J 29/393* (2013.01)

(58) Field of Classification Search
None
See application file for complete search history.

(56) References Cited

U.S. PATENT DOCUMENTS

| | | | |
|---|---|---|---|
| 5,028,806 A | 7/1991 | Stewart et al. | |
| 5,309,031 A | 5/1994 | Stewart et al. | |
| 2020/0269620 A1* | 8/2020 | Hanagami | B41J 3/36 |

FOREIGN PATENT DOCUMENTS

| | | | |
|---|---|---|---|
| CN | 210181659 U * | 3/2020 | |
| JP | H02-299149 A | 12/1990 | |

* cited by examiner

*Primary Examiner* — Leslie J Thompson
*Assistant Examiner* — Samuel Frederick Boelitz
(74) *Attorney, Agent, or Firm* — Kenealy Vaidya LLP

(57) ABSTRACT

A printing device includes: a printing engine configured to be driven by electric power from a battery including a battery terminal; a housing defining a battery accommodating portion; a contact terminal facing downward and configured to flex upward; and a battery tray attachable to the battery accommodating portion. In a state where the battery is mounted on a mounting surface of the battery tray, the battery is movable between: a first position at which the battery is in a first posture; and a second position at which the battery is in a second posture. During an attachment process of the battery tray to the battery accommodating portion, a pressing portion of the walls presses the battery at the second position to move the battery to the first position and place the battery in the first posture such that the battery terminal contacts the contact terminal from below.

15 Claims, 6 Drawing Sheets

PRINTING DEVICE INCLUDING BATTERY TRAY ATTACHABLE TO BATTERY ACCOMMODATING PORTION OF HOUSING AND HAVING MOUNTING SURFACE CONFIGURED TO SUPPORT BATTERY

REFERENCE TO RELATED APPLICATIONS

This application claims priority from Japanese Patent Application No. 2023-169268 filed on Sep. 29, 2023. The entire content of the priority application is incorporated herein by reference.

BACKGROUND ART

A conventional battery tray includes contact terminals, and is formed with an opening. The opening is open at one end of the battery tray. The contact terminals are mounted on a bottom surface of the battery tray. The bottom surface is one of inner surfaces of the battery tray and extends in a direction crossing the opening. A battery pack is configured to be inserted into the battery tray through the opening. As a result of insertion of the battery pack in the battery tray, battery terminals of the battery pack are in contact with the corresponding contact terminals of the battery tray. In this state, the contact terminals flex toward the bottom surface by a load applied from the corresponding battery terminals.

SUMMARY

It is conceivable that the conventional battery tray described above be employed in a printing device. During an insertion process of a battery pack into a battery accommodating portion of the printing device, a battery terminal of the battery pack may come into contact with a contact terminal of the printing device in a direction orthogonal to a direction in which the contact terminal flexes. This contact of the battery terminal with the contact terminal may cause an excessive load to be imparted on the contact terminal. As a result, in the printing device incorporating the battery tray described above, there may occur a contact failure or a peeling off in the contact terminal, thereby lowering durability of the contact terminal.

In view of the foregoing, it is an object of the present disclosure to provide a printing device and a battery unit which are capable of enhancing durability of a contact terminal configured to contact a battery terminal in a battery.

In order to attain the above and other objects, according to one aspect, the present disclosure provides a printing device including: a printing engine; a housing; a contact terminal; and a battery tray. The printing engine is configured to be driven by electric power supplied from a battery and to perform printing on a printing medium. The housing includes a plurality of walls defining a space serving as a battery accommodating portion configured to accommodate therein the battery. The battery accommodating portion is open in a first direction orthogonal to an up-down direction. The plurality of walls includes an upper wall formed with an opening that is open downward. The contact terminal is electrically connected to the printing engine. The contact terminal faces downward and is exposed to the battery accommodating portion through the opening formed in the upper wall. The contact terminal flexes upward in a state where the contact terminal is in contact with a battery terminal provided on an upper surface of the battery accommodated in the battery accommodating portion. The battery tray has a mounting surface on which the battery is configured to be mounted from above. The battery tray is attachable to the battery accommodating portion in a second direction opposite the first direction. In a state where the battery is mounted on the mounting surface, the mounting surface supports the battery such that the battery is movable on the mounting surface between: a first position; and a second position, The battery at the first position is placed in a first posture. The battery at the second position is placed in a second posture. The battery at the second position is positioned further in the second direction relative to the battery at the first position. The battery terminal on the battery in the second posture is positioned further downward relative to the battery terminal on the battery in the first posture. The plurality of walls further includes a pressing portion. During an attachment process of the battery tray to the battery accommodating portion, the pressing portion presses the battery at the second position in the first direction to move the battery to the first position and place the battery in the first posture such that the battery terminal contacts the contact terminal from below.

In the above structure, since the posture of the battery is changed from the second posture to the first posture by the pressing portion in accordance with the attachment process of the battery tray into the battery accommodating portion, the battery terminal of the battery contacts the contact terminal from below. Accordingly, the contact terminal receives a load from the battery terminal from below and flexes upward. The printing device can enhance durability of the contact terminal configured to contact the battery terminal in this way.

According to another aspect, the present disclosure also provides a battery unit attachable to a printing device including a printing engine configured to be driven by electric power supplied from a battery and to perform printing on a printing medium. The battery unit includes: a unit housing; a contact terminal; and a battery tray. The unit housing includes a plurality of walls defining a space serving as a battery accommodating portion configured to accommodate therein the battery. The battery accommodating portion is open in a first direction orthogonal to an up-down direction. The plurality of walls includes an upper wall formed with an opening that is open downward. The contact terminal is electrically connected to the printing engine in a state where the battery unit is attached to the printing device. The contact terminal faces downward and is exposed to the battery accommodating portion through the opening formed in the upper wall. The contact terminal flexes upward in a state where the contact terminal is in contact with a battery terminal provided on an upper surface of the battery accommodated in the battery accommodating portion. The battery tray has a mounting surface on which the battery is configured to be mounted from above. The battery tray is attachable to the battery accommodating portion in a second direction opposite the first direction. In a state where the battery is mounted on the mounting surface, the mounting surface supports the battery such that the battery is movable on the mounting surface between: a first position; and a second position. The battery at the first position is placed in a first posture. The battery at the second position is placed in a second posture. The battery at the second position is positioned further in the second direction relative to the battery at the first position. The battery terminal on the battery in the second posture is positioned further downward relative to the battery terminal on the battery in the first posture. The plurality of walls further includes a pressing portion. During an attachment process of the battery tray to the battery accommodating portion, the pressing portion presses the battery at the second position in the first direction to move the battery to the first position and place the battery in the first posture such that the battery terminal contacts the contact terminal from below.

Also in the above structure, the posture of the battery is changed from the second posture to the first posture by the pressing portion in accordance with the attachment process of the battery tray into the battery accommodating portion, whereby the battery terminal of the battery contacts the contact terminal from below. Accordingly, the contact terminal receives a load from the battery terminal from below and flexes upward. Consequently, the battery unit according to the other aspect can exhibit the technical advantages of the printing device according to the aspect.

DESCRIPTION

Figure 1:
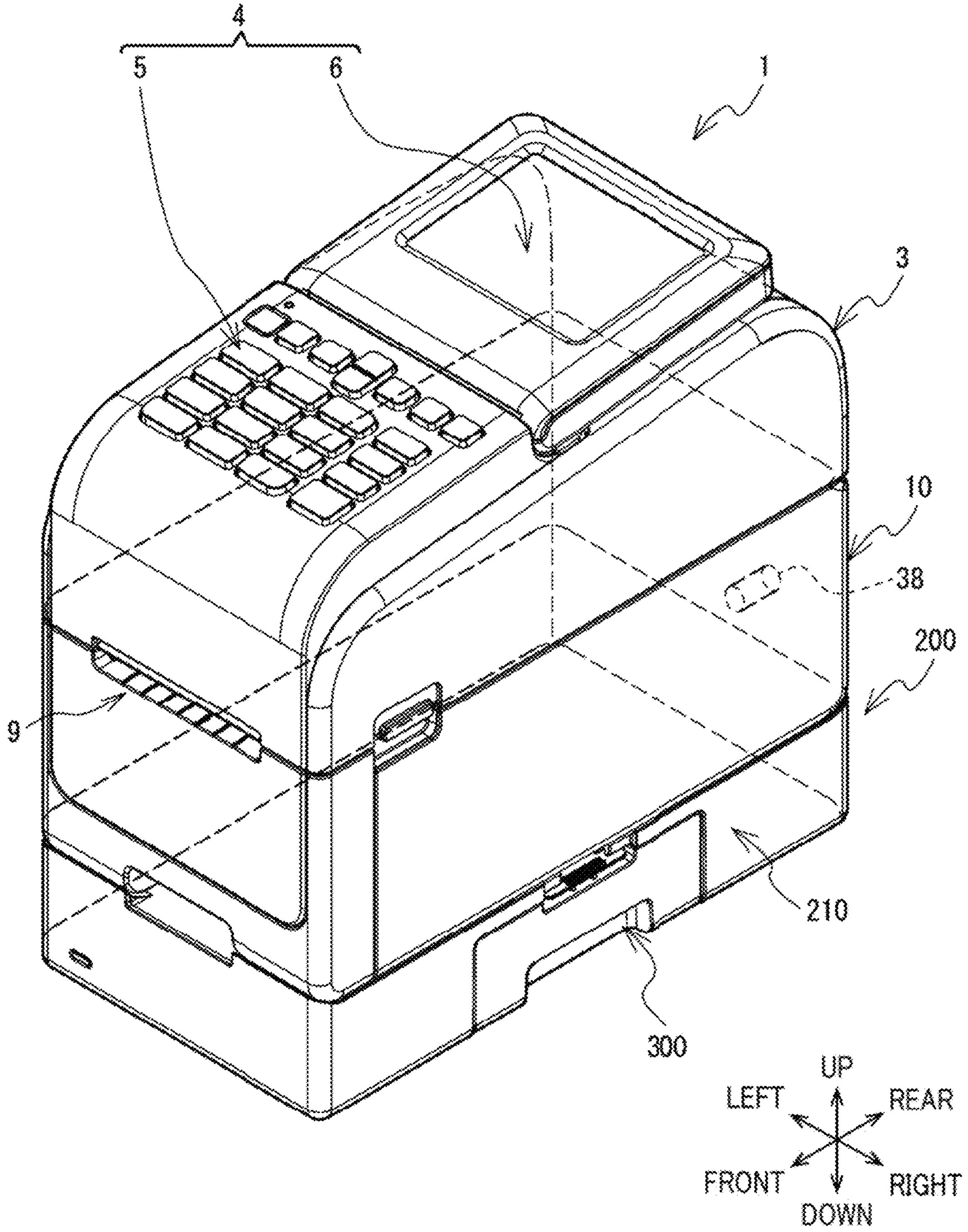
FIG. 1 is a perspective view of a printing device 1, and a battery unit 200 which has been attached to the printing device 1.

Hereinafter, a printing device 1 according to one embodiment of the present disclosure will be described while referring to the accompanying drawings. Note that the description as to the printing device 1 will be made on the basis of directions which are indicated by arrows in the drawings to facilitate understanding. The terms "front", "rear", "up", "down", "left", and "right" in the drawings correspond to frontward, rearward, upward, downward, leftward, and rightward of the printing device 1, respectively.

The printing device 1 is of a heat-sensitive type. The printing device 1 is configured to be driven by electric power supplied from an AC adaptor (not illustrated) as an external power source. The printing device 1 is also configured to be driven by electric power supplied from a battery 39 (described later) accommodated in a battery unit 200 (described later). The printing device 1 is configured to print characters such as letters and figures on a printing medium on the basis of print data.

Figure 2:
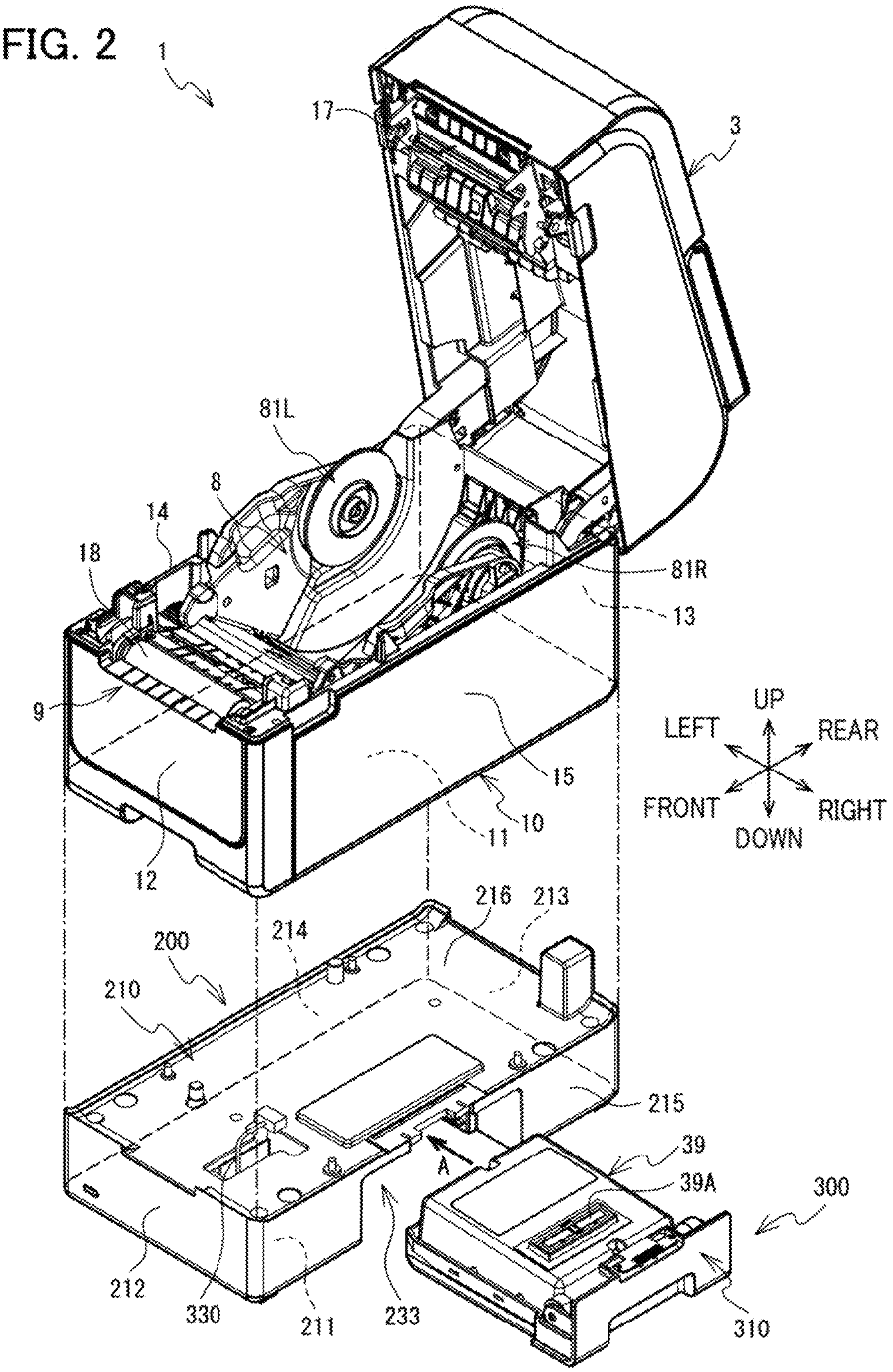
FIG. 2 is a perspective view of the printing device 1, and the battery unit 200 which has been detached from the printing device 1.

The printing device 1 will be described with reference to FIGS. 1 and 2. The printing device 1 has a rectangular parallelepiped shape that is elongated in a front-rear direction. The printing device 1 includes an outer shell configured of a device housing 10 and an opening-closing cover 3. The device housing 10 includes a bottom plate 11, a front plate 12, a rear plate 13, a left plate 14, and a right plate 15. The device housing 10 has a box-like shape whose upper end is formed with an opening open upward.

The printing device 1 further includes an AC adaptor jack 38 provided on the rear plate 13. The electric power from the AC adaptor (not illustrated) is supplied to the printing device 1 through the AC adaptor jack 38. An accommodating portion 8 for receiving the printing medium is provided in a rear end portion of the device housing 10. The accommodating portion 8 includes a left support part 81L, and a right support part 81R. The left support part 81L and the right support part 81R are configured to support the printing medium which is in a form of a roll in cooperation with each other so that the roll of the printing medium is rotatable.

A platen roller 18 is rotatably supported in a front end portion of the device housing 10. The platen roller 18 extends in a left-right direction. The platen roller 18 is rotatable by a driving force from a motor (not illustrated). By rotating, the platen roller 18 is configured to convey the printing medium from the accommodating portion 8 toward a discharge opening 9 formed in an upper end of the front plate 12. The discharge opening 9 extends in the left-right direction. The discharge opening 9 allows the printed printing medium to be discharged out of the device housing 10 therethrough.

The opening-closing cover 3 is configured to open and close the opening in the device housing 10. The opening-closing cover 3 constitutes an upper end portion of the outer shell of the printing device 1. An operating portion 4 is provided on the opening-closing cover 3. The operating portion 4 includes a key panel 5, and a display 6 which is positioned rearward of the key panel 5. The key panel 5 includes a plurality of physical keys through which a user can input information. That is, the key panel 5 is configured to receive user operations. The display 6 is a touch panel, for example. The display 6 is configured to be touched by the user for receiving the user operations and to display information thereon.

A thermal head 17 is provided in a front end portion of the opening-closing cover 3. The thermal head 17 extends in the left-right direction. The thermal head 17 is configured to be driven by, for example, electric power supplied from the battery 39. When a printing operation is performed, the thermal head 17 faces the platen roller 18 from above. The thermal head 17 is configured to heat the printing medium at a position between the thermal head 17 and the platen roller 18 to print characters on the printing medium. The printed printing medium is discharged out of the printing device 1 through the discharge opening 9.

The battery unit 200 will next be described with reference to FIGS. 2 and 3. As illustrated in FIG. 2, the battery unit 200 is attachable to and detachable from the bottom plate 11 of the device housing 10. The battery unit 200 includes a unit housing 210. The unit housing 210 includes a bottom plate 211, a front plate 212, a rear plate 213, a left plate 214, a right plate 215, and a top plate 216. The unit housing 210 has a rectangular parallelepiped shape and is elongated in the front-rear direction.

The unit housing 210 has a battery accommodating portion 233. The battery accommodating portion 233 is a space having a rectangular parallelepiped shape that is elongated in the left-right direction. A battery tray 300 (describe later) having the battery 39 mounted thereon is attachable to the battery accommodating portion 233. That is, the battery 39 is configured to be accommodated in the space of the battery accommodating portion 233. The bottom plate 211 has a center region recessed upward toward the top plate 216 that forms the battery accommodating portion 233. The battery accommodating portion 233 is open downward in a center in the front-rear direction of the bottom plate 211. Further, the battery accommodating portion 233 is open rightward. The battery accommodating portion 233 is positioned downward of the device housing 10, since the battery unit 200 is attached to the bottom plate 11 of the device housing 10.

Figure 3:
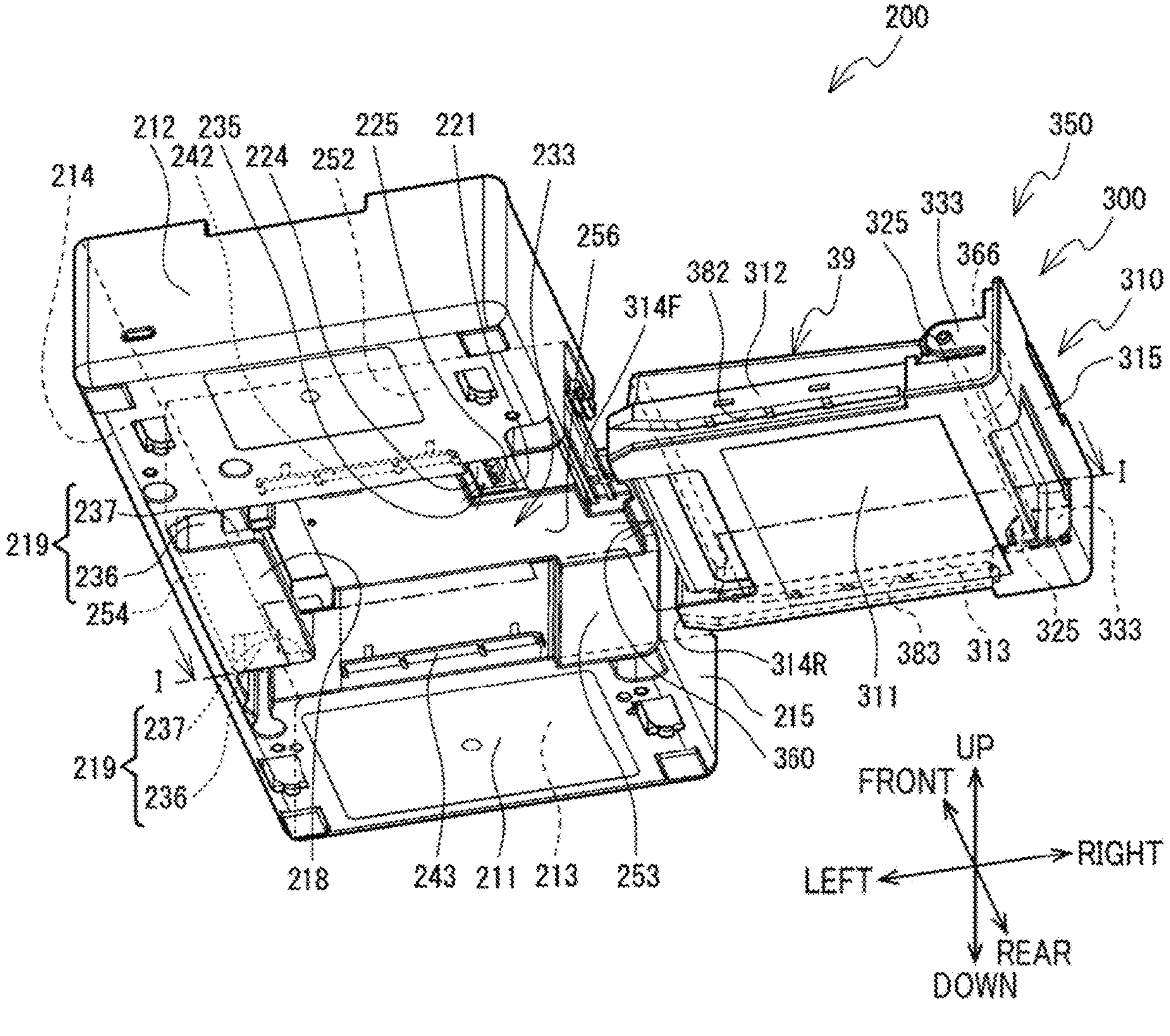
FIG. 3 is a perspective view of the battery unit 200 as viewed from the rear side and the upper side thereof.

As illustrated in FIG. 3, the space of the battery accommodating portion 233 is defined by walls including a front wall 252, a rear wall 253, a left wall 254, an upper wall 256, a support wall 218, and the like. The upper wall 256 has a right end portion having an opening 235 that is open in an up-down direction. The upper wall 256 also has a front end on which a hook engaging part 261 (see FIG. 4) is provided. The hook engaging part 261 is configured to engage with a hook 361 (see FIG. 4, described later) of the battery tray 300.

Figure 4:
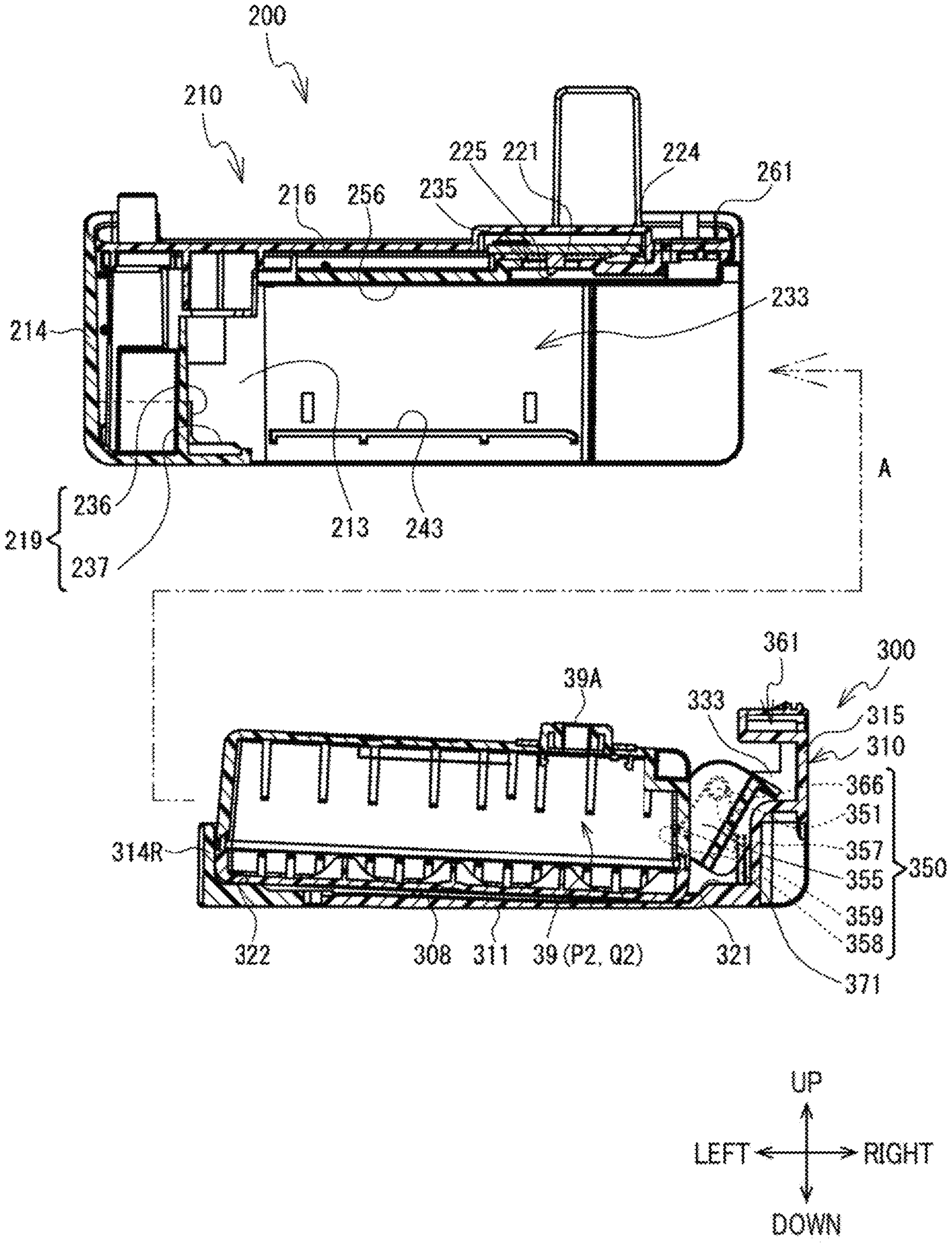
FIG. 4 is a cross-sectional view taken along line IV-IV in FIG. 3, and illustrating a state prior to insertion of a battery tray 300 into a battery accommodating portion 233.

As illustrated in FIG. 4, a board 221 is provided between the top plate 216 of the unit housing 210 and the upper wall 256 defining the battery accommodating portion 233. The board 221 extends in a direction orthogonal to the up-down direction. That is, the board 221 has a plate-like shape extending in both the front-rear direction and the left-right direction. The board 221 has a lower surface serving as a component side 224. That is, the component side 224 is a surface of the board 221 that faces downward.

A plurality of contact terminals 225 are mounted on the component side 224 and arranged in the front-rear direction. The contact terminals 225 face downward and are exposed to the battery accommodating portion 233 through the opening 235 formed in the upper wall 256. The contact terminals 225 are positioned further rightward relative to a center in the left-right direction of the battery accommodating portion 233. The contact terminals 225 are configured to contact a battery terminal 39A (see FIG. 2, described later) of the battery 39.

The contact terminals 225 on the board 221 are electrically connected to a board (not illustrated) in the printing device 1 through a harness 330 (see FIG. 2) in a state where the battery unit 200 is attached to the device housing 10. That is, the contact terminals 225 are electrically connected to the operating portion 4, the thermal head 17, the platen roller 18, and the like through the board in the printing device 1 in a state where the battery unit 200 is attached to the device housing 10. With this configuration, the printing device 1 is configured to be driven by electric power from the battery 39 attached to the battery accommodating portion 233.

As illustrated in FIG. 3, guide rails 242 and 243 are provided on the front wall 252 and the rear wall 253, respectively. Each of the pair of guide rails 242 and 243 extends in the left-right direction. The guide rail 242 protrudes rearward from the front wall 252, while the guide rail 243 protrudes frontward from the rear wall 253. The pair of guide rails 242 and 243 are configured to guide movement in the left-right direction of the battery tray 300 (described later).

The support wall 218 extends rightward from a center portion in the front-rear direction of a lower end of the left plate 214. The support wall 218 has a rectangular plate-like shape. The support wall 218 has a front end positioned away from the front wall 252 by a predetermined distance. The support wall 218 has a rear end positioned away from the rear wall 253 by a predetermined distance.

A pair of plate members 219 (i.e., a front plate member 219 and a rear plate member 219) are respectively provided at the front end and the rear end of the support wall 218. Specifically, the front plate member 219 protrudes from the front end of the support wall 218, and the rear plate member 219 protrudes from the rear end of the support wall 218. The front plate member 219 has an L-shape as viewed from the front side thereof. The L-shaped front plate member 219 includes a pressing portion 236 extending in the up-down direction, and a third support portion 237 extending in the left-right direction. The third support portion 237 extends rightward from a lower end of the pressing portion 236. Note that a first support portion 321 and a second support portion 322 of the battery tray 300 will be described later. The third support portion 237 has an upper end at the same position in the up-down direction as an upper end of the first support portion 321. The rear plate member 219 has a configuration the same as that of the front plate member 219. Accordingly, further description as to the rear plate member 219 will be omitted.

Next, the battery tray 300 will be described with reference to FIGS. 3 and 4. As described above, the battery tray 300 is attachable to the battery accommodating portion 233. The battery tray 300 includes a tray housing 310, the first support portion 321, the second support portion 322, and a restriction portion 350. The tray housing 310 includes a bottom plate 311, a front plate 312, a rear plate 313, a front left plate 314F, a rear left plate 314R, and a right plate 315. The tray housing 310 is open upward.

The bottom plate 311 has a rectangular shape. The bottom plate 311 has a rectangular notch cut rightward from a left end of the bottom plate 311 at a center portion in the front-rear direction of the left end of the bottom plate 311. The shape of the notch is in conformance with the shape of the support wall 218. The bottom plate 311 has an upper surface serving as a mounting surface 308. The mounting surface 308 extends in a direction crossing the up-down direction. Specifically, the mounting surface 308 is sloped downward as extending rightward.

The battery 39 is configured to be mounted on the mounting surface 308 from above. The battery terminal 39A is provided on an upper surface of the battery 39. The mounting surface 308 has a length in the left-right direction slightly greater than a length in the left-right direction of the battery 39. A pair of abutment plates 371 (a front abutment plate and a rear abutment plate 371) is provided on the mounting surface 308. The front abutment plate extends upward from a front end portion of a right end portion of the mounting surface 308. The rear abutment plate 371 (see FIG. 4) extends upward from a rear end portion of the right end portion of the mounting surface 308. Although illustration of the front abutment plate is omitted from the drawings, the front abutment plate and the rear abutment plate 371 have configurations the same as each other.

The hook 361 is provided on an upper end portion of the right plate 315 to protrude leftward. The hook 361 is configured to be engaged with the hook engaging part 261. The front left plate 314F is disposed on a front end portion of the left end of the bottom plate 311. The rear left plate 314R is disposed on a rear end portion of the left end of the bottom plate 311. The front left plate 314F is positioned frontward of the rear left plate 314R to be spaced apart from the rear left plate 314R. The front left plate 314F and the rear left plate 314R form an opening 360 therebetween at a left end portion of the battery tray 300. The opening 360 is open leftward.

Engaging portions 382 and 383 are formed on the front plate 312 and the rear plate 313, respectively. Each of the engaging portions 382 and 383 extends in the left-right direction. The engaging portion 382 on the front plate 312 is recessed rearward, and the engaging portion 383 on the rear plate 313 is recessed frontward. The engaging portions 382 and 383 are engaged with the guide rails 242 and 243, respectively, so as to be slidingly movable relative to the same.

The first support portion 321 is provided on the right end portion of the mounting surface 308. The first support portion 321 protrudes upward from a center portion in the front-rear direction of the mounting surface 308. The upper end of the first support portion 321 has a sloped part sloped upward from a left end to a center in the left-right direction of the first support portion 321, and a horizontal part extending in the left-right direction from the center in the left-right direction to a right end of the first support portion 321.

The second support portion 322 is provided on a left end portion of the mounting surface 308. The second support portion 322 protrudes upward from the left end portion of the mounting surface 308, and extends in the front-rear direction. The second support portion 322 has an upper end positioned at the same position in the up-down direction of the upper end of the first support portion 321. Further, the upper end of the second support portion 322 is positioned further upward relative to the mounting surface 308.

As illustrated in FIGS. 3 and 4, the restriction portion 350 is positioned on a right end portion of the battery tray 300. The restriction portion 350 has a hinge structure. The restriction portion 350 is configured to restrict movement of the battery 39 mounted on the mounting surface 308. The detailed description as to the configuration and the function of the restriction portion 350 will be made later. The restriction portion 350 has a symmetrical configuration in the front-rear direction. The restriction portion 350 includes a pair of support plates 333 (a front support plate 333 and a rear support plate 333), a pair of accommodating portions 355 (a front accommodating portion and a rear accommodating portion 355), a plate 351, and a pair of urging members 357 (a front urging member and a rear urging member 357).

As illustrated in FIG. 3, the front support plate 333 extends leftward from a front end portion of the right plate 315. The front support plate 333 is formed with a support hole 325 penetrating the front support plate 333 in the front-rear direction. The rear support plate 333 extends leftward from a rear end portion of the right plate 315. The rear support plate 333 is formed with a support hole 325 penetrating the rear support plate 333 in the front-rear direction. A pivot shaft 366 extending in the front-rear direction is inserted through the support holes 325 such that the pivot shaft 366 is supported by the front support plate 333 and the rear support plate 333.

Each of the two accommodating portions 355 has a rectangular shape as viewed in the front side thereof. The front accommodating portion is positioned rearward of the front support plate 333. The front accommodating portion is supported by a front end portion of the pivot shaft 366 so as to be pivotally movable. The rear accommodating portion 355 is positioned frontward of the rear support plate 333. The rear accommodating portion 355 is supported by a rear end portion of the pivot shaft 366 so as to be pivotally movable.

Each of the front accommodating portion and the rear accommodating portion 355 has an accommodation space. Abutment parts 358 and 359 arranged in the left-right direction are positioned in a lower-left portion of the accommodation space in each of the accommodating portions 355. The abutment parts 358 and 359 extend in the front-rear direction in the accommodation space of the corresponding accommodating portion 355. Each of the abutment parts 358 and 359 has a solid cylindrical shape. Note that the front abutment plate and the rear abutment plate 371 protruding from the mounting surface 308 are positioned in the accommodation spaces of the front accommodating portion and the rear accommodating portion 355, respectively.

The front urging member and the rear urging member 357 are accommodated in the accommodation spaces in the front accommodating portion and the rear accommodating portion 355, respectively. Each of the two urging members 357 is, for example, a torsion spring including a coil part, a first arm part, and a second arm part. Specifically, the coil part of the rear urging member 357 is disposed over the rear end portion of the pivot shaft 366. The first arm part of the rear urging member 357 extends diagonally downward and leftward from a left end of the coil part. The first arm part has a lower end portion positioned between the abutment parts 358 and 359 accommodated in the accommodation space of the rear accommodating portion 355. The second arm part of the rear urging member 357 extends diagonally downward and rightward from a right end of the coil part. The second arm part has a lower end portion in contact with the rear abutment plate 371 from the left side thereof. With this configuration, the rear urging member 357 restricts the rear accommodating portion 355 from pivotally moving in a counterclockwise direction about the pivot shaft 366 as viewed the front side thereof.

Note that the rear accommodating portion 355, the abutment parts 358 and 359 accommodated in the rear accommodating portion 355, and the rear urging member 357 is illustrated in the drawings, while illustrations of the front accommodating portion, the abutment parts accommodated in the front accommodating portion, and the front urging member are omitted from the drawings. However, since the restriction portion 350 has a symmetrical configuration in the front-rear direction, the front accommodating portion, the abutment parts accommodated in the front accommodating portion, and the front urging member have configurations the same as those of the rear accommodating portion 355, the abutment parts 358 and 359 accommodated in the rear accommodating portion 355, and the rear urging member 357, respectively.

The plate 351 extends in the front-rear direction between the front accommodating portion and the rear accommodating portion 355. The plate 351 is sloped downward as extending leftward. The plate 351 is pivotally movable together with the front accommodating portion and the rear accommodating portion 355 about the pivot shaft 366. The plate 351 is positioned upward of the first support portion 321 and is overlapped with the first support portion 321 as viewed from above. Pivotal movement of the plate 351 in the counterclockwise direction as viewed from the front side thereof is restricted by urging forces of the front urging member and the rear urging member 357. Since a lower end portion of the plate 351 is positioned further downward relative to the pivot shaft 366, the lower end portion of the plate 351 is urged leftward by the front urging member and the rear urging member 357.

Figure 6:
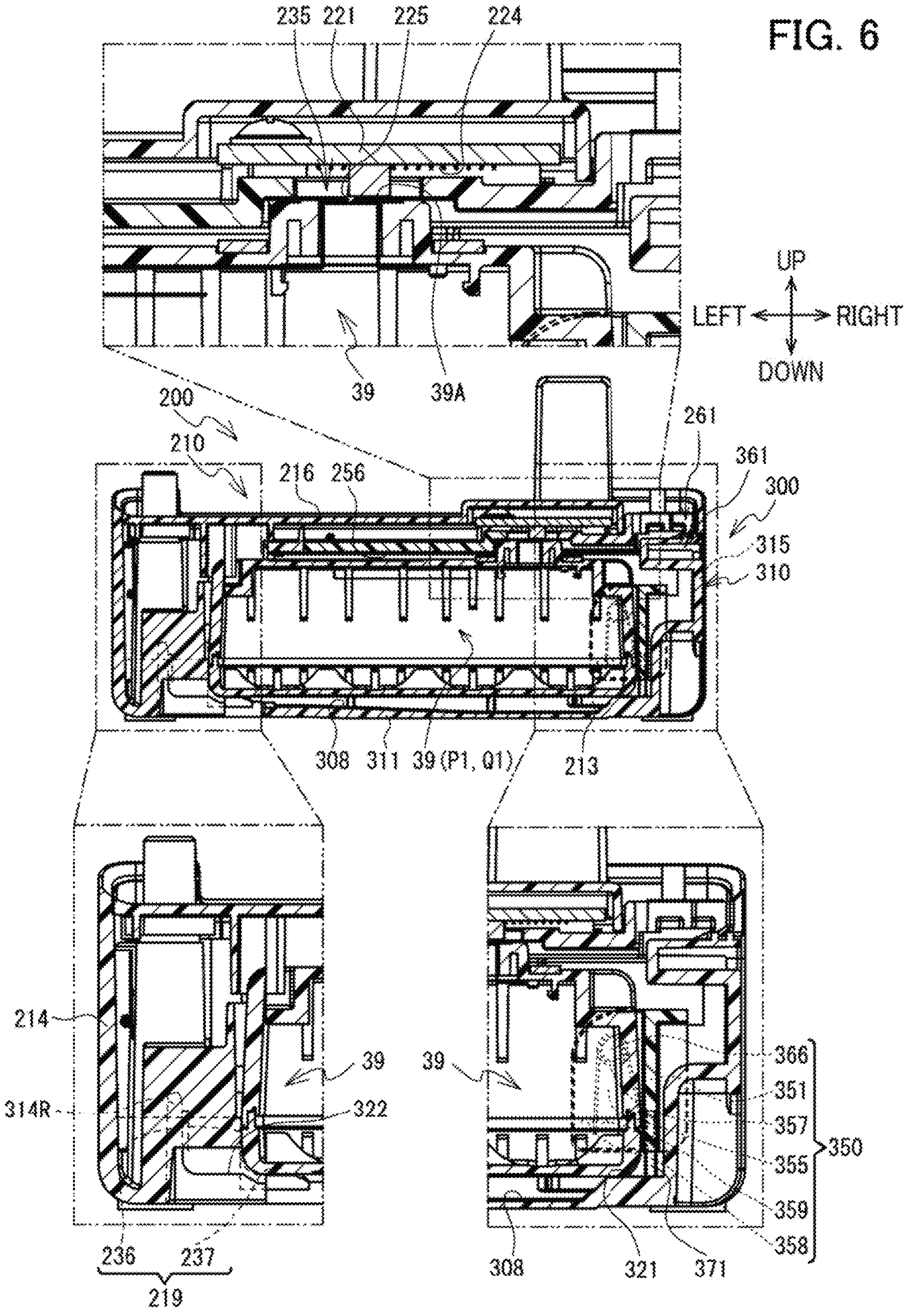
FIG. 6 is a cross-sectional view taken along line IV-IV in FIG. 3, and illustrating a state where the battery tray 300 has been attached to the battery accommodating portion 233.

Next, a first position P1 and a second position P2 of the battery 39 will be described with reference to FIGS. 4 and 6. The battery 39 is movable rightward and leftward on the mounting surface 308 of the battery tray 300. FIG. 6 illustrates the battery 39 at the first position P1 at which the battery 39 is positioned on a right portion of the mounting surface 308, whereas FIG. 4 illustrates the battery 39 at the second position P2 at which the battery 39 is positioned on a left portion of the mounting surface 308. That is, the battery 39 at the second position P2 is positioned further leftward relative to the battery 39 at the first position P1.

Next, a first posture Q1 and a second posture Q2 of the battery 39 will be described with reference to FIGS. 4 and 6. The battery 39 is in the first posture Q1 illustrated in FIG. 6 in a state where the battery 39 is at the first position P1. In this state, a right end portion of the battery 39 is supported by the first support portion 321, and a left end portion of the battery 39 is supported by the third support portions 237. Since the upper end of the first support portion 321 and the upper end of each third support portion 237 are at the same position in the up-down direction, the battery 39 in the first posture Q1 extends parallel to the left-right direction.

The battery 39 is in the second posture Q2 illustrated in FIG. 4 in a state where the battery 39 is at the second position P2. In this state, the left end portion of the battery 39 is supported by the second support portion 322, and the right end portion of the battery 39 is supported by the right end portion of the mounting surface 308. Since the upper end of the second support portion 322 is further upward relative to the mounting surface 308, the right end portion of the battery 39 is positioned further downward relative to the left end portion of the battery 39. Hence, the battery 39 in the second posture Q2 is inclined downward as extending rightward.

Comparing the first posture Q1 with the second posture Q2, the battery terminal 39A of the battery 39 in the first posture Q1 is positioned further upward relative to the battery terminal 39A of the battery 39 in the second posture Q2.

Next, an attachment process of the battery 39 to the battery accommodating portion 233 performed by the user will be described with reference to FIG. 4 through 6. The following description is based on an initial state in which the battery unit 200 is attached to the bottom plate 11 of the device housing 10, the battery tray 300 is detached from the battery accommodating portion 233, and the battery 39 is not mounted on the mounting surface 308 of the battery tray 300.

First, the user places the battery 39 on the mounting surface 308 of the battery tray 300 as illustrated in FIG. 4 so that the battery 39 is positioned at the second position P2 with respect to the battery tray 300. Accordingly, the battery 39 is in the second posture Q2.

At this time, the restriction portion 350 restricts rightward movement of the battery 39 from the second position P2. Specifically, the lower end portion of the plate 351 of the restriction portion 350 is configured to contact the right end portion of the battery 39. Since the lower end portion of the plate 351 is urged leftward by the two urging members 357, the rightward movement of the battery 39 is restricted. As a result, the battery 39 is maintained in the second posture Q2 while the battery 39 is at the second position P2.

The user inserts the battery tray 300 having the battery 39 mounted thereon leftward as indicated by an arrow A in FIG. 4 into the battery accommodating portion 233. At this time, the user engages the engaging portions 382 and 383 of the battery tray 300 with the guide rails 242 and 243 of the battery accommodating portion 233, respectively. Hence, the user can stably perform leftward movement of the battery tray 300. The user further moves the battery tray 300 leftward inside the battery accommodating portion 233.

Figure 5:
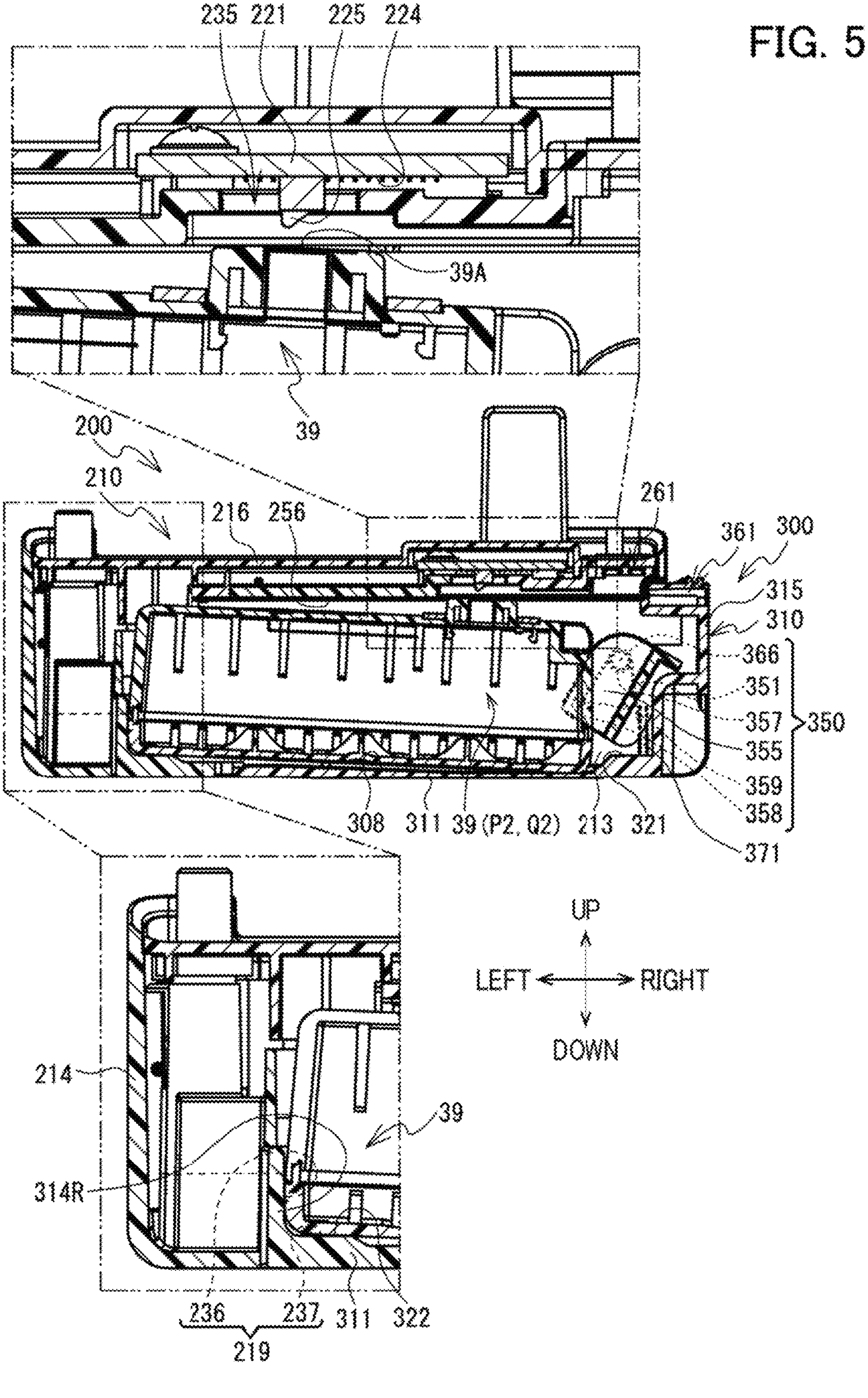
FIG. 5 is a cross-sectional view taken along line IV-IV in FIG. 3, and illustrating a state where pressing portions 236 press a battery 39 rightward.

As illustrated in FIG. 5, the left end portion of the battery 39 in the second posture Q2 is brought into contact with the pressing portions 236 of the front plate member 219 and the rear plate members 219. This contact of the battery 39 with the pressing portions 236 restricts leftward movement of the battery 39 within the battery accommodating portion 233. At this time, the left end portion of the battery 39 is supported by the third support portions 237.

The user further moves the battery tray 300 leftward with the pressing portions 236 being in contact with the battery 39. As a result, the pressing portions 236 are inserted into an inner space of the battery tray 300 through the opening 360. Since the pressing portions 236 restrict the leftward movement of the battery 39, the battery 39 is moved rightward relative to the battery tray 300. In other words, the battery 39 is moved from the second position P2 to the first position P1 by the pressing portions 236 in accordance with the leftward movement of the battery tray 300. The restriction of the leftward movement of the battery 39 by the pressing portions 236 implies application of a pressing force directed rightward of the pressing portions 236 against the battery 39.

During the movement of the battery 39 toward the first position P1, the right end portion of the battery 39 is brought into contact with the plate 351 of the restriction portion 350 from the left side thereof. The battery 39 is moved rightward against the urging forces of the urging members 357 of the restriction portion 350 that is directed leftward, whereby the right end portion of the battery 39 is guided to the first support portion 321. Since the upper end of the first support portion 321 has the sloped part sloping upward as extending rightward, the battery 39 can be smoothly moved rightward. That is, the battery 39 is moved from the second position P2 toward the first position P1 due to the pressing forces of the pressing portions 236 that are directed rightward. Further, the plate 351 of the restriction portion 350 is pivotally moved in the counterclockwise direction together with the accommodating portions 355 as viewed from the front side thereof.

During the movement of the battery 39 from the second position P2 to the first position P1, the posture of the battery 39 is changed from the second posture Q2 to the first posture Q1 due to the pressing forces from the pressing portions 236 that are directed rightward against the battery 39. Hence, the battery terminal 39A of the battery 39 is moved upward, because the right end portion of the battery 39 is moved onto the first support portion 321. Accordingly, the battery terminal 39A is brought into contact with the contact terminals 225 exposed to the battery accommodating portion 233 from below, thereby causing the contact terminals 225 to flex upward.

In a state where the battery tray 300 is accommodated in the battery accommodating portion 233, the hook 361 of the battery tray 300 is in engagement with the hook engaging part 261. Further, a left surface of the plate 351 of the restriction portion 350 is in contact with the right end portion of the battery 39. On the other hand, the left end portion of the battery 39 is fixed in position in the left-right direction by the pressing portions 236. As a result, the battery 39 is maintained at the first position P1.

In this way, replacement of the battery 39 is performed. Note that a detachment process of the battery tray 300 from the battery accommodating portion 233 can be performed by operations opposite the above-described operations in the attachment process.

As described above, the battery tray 300 is attachable to the battery accommodating portion 233 by the leftward movement thereof from the outside of the printing device 1. The mounting surface 308 supports the battery 39 such that the battery 39 is movable on the mounting surface 308 between the first position P1 in which the battery 39 is positioned on the right portion of the mounting surface 308, and the second position P2 in which the battery 39 is positioned on the left portion of the mounting surface 308. The battery 39 is placed in the first posture Q1 in a state where the battery 39 is at the first position P1. The battery

39 is placed in the second posture Q2 in a state where the battery 39 is at the second position P2. The battery terminal 39A on the battery 39 in the second posture Q2 is positioned further downward relative to the battery terminal 39A on the battery 39 in the first posture Q1.

The support wall 218 includes the pressing portions 236. During the attachment process of the battery tray 300 to the battery accommodating portion 233, the pressing portions 236 press the battery 39 positioned at the second position P2 rightward to move the battery 39 from the second position P2 to the first position P1, thereby placing the battery 39 in the first posture Q1. In the first posture Q1 of the battery 39, the pressing portions 236 cause the battery terminal 39A to contact the contact terminals 225 from below.

As described above, in the printing device 1, the battery terminal 39A of the battery 39 is brought into contact with the contact terminals 225 from below. In this state, the contact terminals 225 receive a load from the battery terminal 39A and flex upward. According to this manner of contact, application of excessive load on the contact terminals 225 can be restrained. This is because a direction in which the contact terminals 225 flex is approximately coincident with a direction in which the battery terminal 39A contacts the contact terminals 225, and the battery terminal 39A is less likely to contact the contact terminals 225 from the right side thereof, for example. Hence, the printing device 1 according to the above-described embodiment can improve durability of the contact terminals 225 which the battery terminal 39A is configured to contact.

The first support portion 321 is positioned on the right end portion of the mounting surface 308. The first support portion 321 protrudes upward from the mounting surface 308. The first support portion 321 supports the battery 39 positioned at the first position P1 such that the battery 39 is maintained in the first posture Q1. The printing device 1 can support the battery 39, with a simple structure, while the battery 39 is in the first posture Q1.

The second support portion 322 is positioned on the left end portion of the mounting surface 308. The second support portion 322 protrudes upward from the mounting surface 308. The second support portion 322 supports the battery 39 positioned at the second position P2 such that the battery 39 is maintained in the second posture Q2. The printing device 1 can support the battery 39, with a simple structure, while the battery 39 is in the second posture Q2.

The battery tray 300 includes the restriction portion 350. The restriction portion 350 is provided on the right end portion of the battery tray 300. The restriction portion 350 is configured to restrict the battery 39 from moving from the second position P2 to the first position P1 without insertion of the battery tray 300 into the battery accommodating portion 233. Accordingly, in a state where the battery tray 300 is not inserted in the battery accommodating portion 233, the battery 39 can be maintained in the second posture Q2 by the restriction portion 350 configured to restrict the movement of the battery 39.

The restriction portion 350 includes the plate 351, the accommodating portions 355, and the urging members 357. The plate 351 extends in the front-rear direction. The accommodating portions 355 are pivotally movable about the pivot shaft 366 extending in the front-rear direction, and the plate 351 is supported by the accommodating portions 355. With this configuration, the plate 351 is pivotally movable about the pivot shaft 366 along with the pivotal movement of the accommodating portions 355. The urging members 357 urge the plate 351 leftward. The plate 351 is configured to contact the right end of the battery 39 in the second posture Q2 from the right side thereof. Hence, in a state where the battery tray 300 is not inserted in the battery accommodating portion 233, the battery 39 can be maintained in the second posture Q2 by the plate 351 of the restriction portion 350.

The urging members 357 urge the lower end portion of the plate 351 leftward. The plate 351 is sloped downward as extending leftward due to the urging forces of the urging members 357. There is a likelihood that the battery 39 is moved rightward, and the right end portion of the battery 39 is moved onto the plate 351. In this case, the battery 39 is slidingly moved leftward by the plate 351 because the plate 351 is inclined due to the urging forces of the urging members 357. As a result, the battery 39 can be guided to the second position P2 by the plate 351 in a state where the battery tray 300 is not inserted in the battery accommodating portion 233.

The first support portion 321 is positioned on the right end portion of the mounting surface 308. The first support portion 321 protrudes upward from the mounting surface 308, as described above. The first support portion 321 supports the battery 39 positioned at the first position P1 while the battery 39 is in the first posture Q1. The plate 351 is positioned upward of the first support portion 321, and is positioned to be overlapped with the first support portion 321 when viewed from above. Irrespective of the fact that the first support portion 321 is configured to support the battery 39 at the first position P1 while the battery 39 is maintained in the first posture Q1, the battery 39 is unlikely to be moved onto the first support portion 321 in the printing device 1 because of the positional relationship between the plate 351 and the first support portion 321. Hence, the battery 39 can be maintained in the second posture Q2 while positioned at the second position P2.

The left end portion of the battery tray 300 is formed with the opening 360 that is open leftward. The pressing portions 236 are inserted into the inner space of the battery tray 300 through the opening 360 during the attachment process of the battery tray 300 to the battery accommodating portion 233. Since the pressing portions 236 are inserted in the battery tray 300 through the opening 360, the pressing portions 236 do not restrain the battery tray 300 from moving leftward relative to the battery accommodating portion 233.

The third support portions 237 are provided on the support wall 218. Each of the third support portions 237 supports the left end portion of the battery 39 in a state where the battery tray 300 is attached to the battery accommodating portion 233, i.e., the battery 39 is in the first posture Q1. In the printing device 1, the combination of the first support portion 321 and the third support portions 237 can maintain the battery 39 in the first posture Q1.

The guide rails 242 and 243 are provided on the front wall 252 and the rear wall 253, respectively. The front wall 252 defines a front end of the battery accommodating portion 233, and the rear wall 253 defines a rear end of the battery accommodating portion 233. Each of the guide rails 242 and 243 extends in the left-right direction so as to guide the movement in the left-right direction of the battery tray 300. In the meantime, the front plate 312 and the rear plate 313 extend upward from the front end portion and the rear end portion of the mounting surface 308, respectively. The engaging portions 382 and 383 are formed on the front plate 312 and the rear plate 313, respectively. The engaging portions 382 and 383 extend in the left-right direction. The engaging portions 382 and 383 are engageable with the guide rails 242 and 243 so as to be slidingly movable relative to the guide rails 242 and 243, respectively. The engagements between the guide rails 242 and 243 with the respective engaging portions 382 and 383 enable the movement of the battery tray 300 in the battery accommodating portion 233 to be stably performed. Further, the engagements between the guide rails 242 and 243 with the respective engaging portions 382 and 383 can restrain downward displacement of the battery tray 300.

Since the board 221 of the printing device 1 extends in a direction orthogonal to the up-down direction, a load applied from the battery terminal 39A to the contact terminals 225 can be properly dispersed in the board 221.

The battery accommodating portion 233 is provided at a position further downward relative to the device housing 10, i.e., at a lower portion in the printing device 1. The battery 39 can be accommodated in the battery accommodating portion 233 provided at the lower portion of the printing device 1.

The operating portion 4 is provided at the opening-closing cover 3 which is positioned further upward relative to the device housing 10, i.e., at an upper portion in the printing device 1. With respect to the up-down direction, the battery accommodating portion 233 is provided at the bottom plate 211 of the unit housing 210 that is positioned on the opposite side from the opening-closing cover 3 on which the operating portion 4 is provided. With this arrangement, the printing device 1 can restrain the operating portion 4 from getting damaged during the attachment process of the battery 39 into the battery accommodating portion 233.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the printing device 1 is of a heat-sensitive type. However, other types of printing device, such as an inkjet type printing device, may be employed as the printing device 1. Further, in the above-described embodiment, the printing medium is in a form of a roll shape and is attached to the accommodating portion 8. As a modification, a fan-fold paper, which is supplied from an outside of the printing device 1, may be used. Further, in the above-described embodiment, the printing device 1 has a rectangular parallelepiped shape. However, the shape of the printing device 1 need not be limited thereto and may be suitably modified.

Although the printing device 1 is configured to be driven by an AC adaptor as an external power source in the above-described embodiment, the present disclosure need not limited to this configuration. For example, a USB Power Delivery (USB-PD) may be used as the external power source. Alternatively, the printing device 1 may not be driven by an external power source. In the latter case, the AC adaptor jack 38 may be omitted from the printing device 1.

The printing device 1 may further include a handle configured to be gripped by the user. In this case, the user may grip the handle to place the printing device 1 in an inclined posture. Then, the user may insert the battery tray 300 into the battery accommodating portion 233 while maintaining the printing device 1 in the inclined posture. In this way, the user can operate the printing device 1 using the handle.

In the above-described embodiment, the battery unit 200 is attachable to the device housing 10. However, the device housing 10 and the unit housing 210 of the battery unit 200 may be a housing formed as a single member, and the battery tray 300 may be attachable to the single housing. In this modification, the battery accommodating portion 233 may be provided at a plate positioned in a lower portion of the single housing, and the operating portion 4 may be provided at a plate positioned in an upper portion of the single housing. In this modification, the plate positioned in the lower portion of the single housing corresponds to the "first plate" of the present disclosure, and the plate positioned in the upper portion of the single housing corresponds to the "second plate" of the present disclosure. Note that the opening-closing cover 3 may be provided or may be omitted.

In the above-described embodiment, the battery unit 200 is attachable the bottom plate 11 of the device housing 10. As a modification, the battery unit 200 may be attachable to any one of the front plate 12, the rear plate 13, the left plate 14, and the right plate 15 of the device housing 10. Alternatively, the battery unit 200 may be attachable to the opening-closing cover 3 of the printing device 1. Further, the direction in which the battery tray 300 is inserted into the battery accommodating portion 233 may be suitably modified. In this case, a direction in which the battery terminal 39A contacts the contact terminals 225 corresponds to the "upward" of the present disclosure.

In the above-described embodiment, the battery accommodating portion 233 has a rectangular parallelepiped shape. However, the shape of the battery accommodating portion 233 may be suitably altered in conformance with the shapes of the battery 39 and the battery tray 300. Further, although the battery accommodating portion 233 is open downward and rightward in the above-described embodiment, the battery accommodating portion 233 may be open only rightward.

In the above-described embodiment, the contact terminals 225 are provided at a right portion of the battery accommodating portion 233. However, the present disclosure need not limited to this configuration. The contact terminals 225 may be positioned at a left portion of the battery accommodating portion 233. In the latter case, the battery 39 may be mounted on the mounting surface 308 of the battery tray 300 in such a manner that the right and left sides of the battery 39 are reversed from the state in the above-described embodiment.

In the above-described embodiment, the two plate members 219 have configurations which are symmetrical to each other in the front-rear direction. However, the shape of the front plate member 219 and the shape of the rear plate member 219 are different from each other. Further, a single plate member may be available instead of the two plate members 219 as long as the pressing portion 236 of the single plate member can press the battery 39 rightward.

In the above-described embodiment, the pressing portions 236 are provided on the support wall 218. As a modification, the pressing portions 236 may extend downward from the upper wall 256 so as to restrict the leftward movement of the battery 39. Alternatively, the pressing portions 236 may extend toward the battery accommodating portion 233 from the front wall 252 or from the rear wall 253. In the latter case, the position of the opening 360 may be suitably modified.

Although the battery 39 is supported to be maintained in the first posture Q1 by the first support portion 321 and the third support portions 237 in the above-described embodiment, other configurations may be employed. For example, in the above-described embodiment, the first support portion 321 is positioned on the right end portion of the mounting surface 308 at the center portion in the front-rear direction of the mounting surface 308. As a modification, the first support portion 321 may extend in the front-rear direction along the right end portion of the mounting surface 308. In the latter case, a length in the front-rear direction of the first support portion 321 may be suitably altered. Further, in the above-described embodiment, the front plate member 219 includes the third support portion 237 and the pressing portion 236 which are formed as a single member. As a modification, the third support portion 237 and the pressing portion 236 may be provided as separate members. The same is applied with respect to the rear plate member 219.

In the above-described embodiment, the battery 39 is supported to be maintained in the second posture Q2 by the second support portion 322 and the mounting surface 308. As a modification, the mounting surface 308 may not be sloped but may extend parallel to the left-right direction, and the battery 39 may be maintained in the second posture Q2 by the mounting surface 308 extending in the left-right direction and the second support portion 322. In this case, the position of the second support portion 322 relative to the mounting surface 308 may be suitably modified. Alternatively, the second support portion 322 may be omitted so that the battery 39 is maintained in the second posture Q2 only by the mounting surface 308.

In the above-described embodiment, the board 221 extends in the direction orthogonal to the up-down direction. However, the board 221 may extend to intersect the up-down direction but need not extend in the direction orthogonal to the up-down direction. The contact terminals 225 are mounted on the component side 224 of the board 221 that faces downward. In the printing device 1, a load is applied to the contact terminals 225 from the battery terminal 39A during the attachment process of the battery 39 into the battery accommodating portion 233. According to this modification, the load applied to the contact terminals 225 can be properly dispersed in the board 221 that extends to intersect the up-down direction, thereby improving the durability of the contact terminals 225.

In the above-described embodiment, the operating portion 4 includes the key panel 5 and the display 6. As a modification, the operating portion 4 may include only the key panel 5, or may include only the display 6. The display 6 may not be a touch panel. An arrangement of the key panel 5 and the display 6 may be suitably modified. Further, the operating portion 4 may be omitted from the printing device 1.

The components appearing in the various modifications described above may be suitably selected and combined as long as any conflicting combination is avoided.

REMARKS

In the above-described embodiment and modifications, the printing device 1 is an example of the "printing device"; the thermal head 17 is an example of the "printing engine"; the battery 39 is an example of the "battery"; the combination of the device housing 10 and the unit housing 210 are an example of the "housing"; the combination of the front wall 252, the rear wall 253, the left wall 254, the upper wall 256, and the support wall 218 is an example of the "plurality of walls"; the battery accommodating portion 233 is an example of the "battery accommodating portion"; the rightward direction is an example of the "first direction"; the upper wall 256 is an example of the "upper wall"; the opening 235 is an example of the "opening formed in the upper wall"; the contact terminals 225 are an example of the "contact terminal"; the battery terminal 39A is an example of the "battery terminal"; the battery tray 300 is an example of the "battery tray"; the mounting surface 308 is an example of the "mounting surface"; the leftward direction is an example of the "second direction; the first position P1 is an example of the "first position"; the first posture Q1 is an example of the "first posture"; the second position P2 is an example of the "second position"; the second posture Q2 is an example of the "second posture"; the pressing portions 236 are an example of the "pressing portion"; the first support portion 321 is an example of the "first support portion"; the second support portion 322 is an example of the "second support portion"; the restriction portion 350 is an example of the "restriction portion"; the plate 351 is an example of the "plate"; the front-rear direction is an example of the "orthogonal direction"; the combination of the support plates 333 and the corresponding accommodating portions 355 are examples of the "support member"; the pivot shaft 366 is an example of the "pivot shaft"; the urging members 357 are an example of the "urging member"; the opening 360 is an example of the "opening formed in the battery tray"; the third support portions 237 are an example of the "third support portion"; the front wall 252 is an example of the "first wall"; the rear wall 253 is an example of the "second wall"; the front plate 312 is an example of the "first side wall"; the rear plate 313 is an example of the "second side wall"; the guide rail 242 is an example of the "first guide rail"; the guide rail 243 is an example of the "second guide rail"; the engaging portion 382 is an example of the "first engaging portion"; the engaging portion 383 is an example of the "second engaging portion"; the board 221 is an example of the "board"; the component side 224 is an example of the "component side"; the bottom plate 211 is an example of the "first plate"; the opening-closing cover 3 is an example of the "second plate"; the operating portion 4 is an example of the "operation interface"; the battery unit 200 is an example of the "battery unit"; and the unit housing 210 is an example of the "unit housing".

What is claimed is:

1. A printing device comprising:

a printing engine configured to be driven by electric power supplied from a battery and to perform printing on a printing medium;

a housing comprising a plurality of walls defining a space serving as a battery accommodating portion configured to accommodate therein the battery, the battery accommodating portion being open in a first direction orthogonal to an up-down direction, the plurality of walls comprising an upper wall formed with an opening that is open downward;

a contact terminal electrically connected to the printing engine, the contact terminal facing downward and being exposed to the battery accommodating portion through the opening formed in the upper wall, the contact terminal flexing upward in a state where the contact terminal is in contact with a battery terminal provided on an upper surface of the battery accommodated in the battery accommodating portion; and a battery tray having a mounting surface on which the battery is configured to be mounted from above, the battery tray being attachable to the battery accommodating portion in a second direction opposite the first direction, wherein, in a state where the battery is mounted on the mounting surface, the mounting surface supports the battery such that the battery is movable on the mounting surface between:

a first position, the battery at the first position being placed in a first posture; and a second position, the battery at the second position being placed in a second posture, wherein the battery at the second position is positioned further in the second direction relative to the battery at the first position, wherein the battery terminal on the battery in the second posture is positioned further downward relative to the battery terminal on the battery in the first posture, wherein the plurality of walls further comprises a pressing portion, and wherein, during an attachment process of the battery tray to the battery accommodating portion, the pressing portion presses the battery at the second position in the first direction to move the battery to the first position and place the battery in the first posture such that the battery terminal contacts the contact terminal from below.

2. The printing device according to claim 1, further comprising:

a first support portion provided on one end portion in the first direction of the mounting surface, the first support portion protruding upward from the mounting surface, the first support portion supporting the battery at the first position such that the battery is maintained in the first posture.

3. The printing device according to claim 2, further comprising:

a third support portion provided on one of the plurality of walls, wherein, in a state where the battery tray is attached to the battery accommodating portion, the third support portion supports one end portion in the second direction of the battery in the first posture.

4. The printing device according to claim 1, further comprising:

a second support portion provided on one end portion in the second direction of the mounting surface, the second support portion protruding upward from the mounting surface, the second support portion supporting the battery at the second position such that the battery is maintained in the second posture.

5. The printing device according to claim 1, wherein the battery tray comprises:

a restriction portion provided on one end portion in the first direction of the battery tray, and wherein, in a state where the battery tray is not attached to the battery accommodating portion, the restriction portion restricts movement of the battery from the second position to the first position.

6. The printing device according to claim 5, wherein the restriction portion comprises:

a plate extending in an orthogonal direction orthogonal to both the up-down direction and the first direction;

a support member supporting the plate such that the plate is pivotally movable about a pivot shaft extending in the orthogonal direction; and an urging member urging the plate in the second direction, and wherein the plate is positioned further in the first direction relative to the battery in the second posture, and is configured to contact the battery in the second posture.

7. The printing device according to claim 6, wherein the urging member urges a lower end portion of the plate in the second direction, and wherein the plate is sloped downward as extending in the second direction due to an urging force of the urging member.

8. The printing device according to claim 7, further comprising:

a first support portion provided on one end portion in the first direction of the mounting surface, the first support portion protruding upward from the mounting surface, the first support portion supporting the battery at the first position such that the battery is maintained in the first posture, wherein the plate is positioned upward of the first support portion and is overlapped with the first support portion when viewed from above.

9. The printing device according to claim 1, wherein the battery tray is formed with an opening that is open in the second direction, the opening being formed at one end portion in the second direction of the battery tray, and wherein, during the attachment process of the battery tray to the battery accommodating portion, the pressing portion is inserted into an inner space of the battery tray through the opening formed in the battery tray.

10. The printing device according to claim 1, wherein the plurality of walls further comprises:

a first wall defining one end in an orthogonal direction of the battery accommodating portion, the orthogonal direction being orthogonal to both the up-down direction and the second direction; and a second wall defining an other end in the orthogonal direction of the battery accommodating portion, and wherein the battery tray comprises:

a first side wall extending upward from one end portion in the orthogonal direction of the mounting surface; and a second side wall extending upward from an other end portion in the orthogonal direction of the mounting surface, the printing device further comprising:

a first guide rail provided on the first wall, the first guide rail extending in the second direction, the first guide rail being configured to guide movement in the second direction of the battery tray;

a second guide rail provided on the second wall, the second guide rail extending in the second direction, the second guide rail being configured to guide the movement in the second direction of the battery tray;

a first engaging portion provided on the first side wall, the first engaging portion extending in the second direction, the first engaging portion being engageable with the first guide rail so as to be slidingly movable relative to the first guide rail; and a second engaging portion provided on the second side wall, the second engaging portion extending in the second direction, the second engaging portion being engageable with the second guide rail so as to be slidingly movable relative to the second guide rail.

11. The printing device according to claim 1, further comprising:

a board provided in the housing and extending to cross the up-down direction, the board having a component side facing downward, wherein the contact terminal is mounted on the component side.

12. The printing device according to claim 11, wherein the board extends in a direction orthogonal to the up-down direction.

13. The printing device according to claim 1, wherein the housing further comprises:

a first plate provided at a lower portion of the housing, and wherein the battery accommodating portion is provided on the first plate.

14. The printing device according to claim 13, wherein the housing further comprises:

a second plate provided at an upper portion of the housing, the printing device further comprising:

an operation interface through which a user can input an instruction, the operation interface being provided at the second plate.

15. A battery unit attachable to a printing device comprising a printing engine configured to be driven by electric power supplied from a battery and to perform printing on a printing medium, the battery unit comprising:

a unit housing comprising a plurality of walls defining a space serving as a battery accommodating portion configured to accommodate therein the battery, the battery accommodating portion being open in a first direction orthogonal to an up-down direction, the plurality of walls comprising an upper wall formed with an opening that is open downward;

a contact terminal electrically connected to the printing engine in a state where the battery unit is attached to the printing device, the contact terminal facing downward and being exposed to the battery accommodating portion through the opening formed in the upper wall, the contact terminal flexing upward in a state where the contact terminal is in contact with a battery terminal provided on an upper surface of the battery accommodated in the battery accommodating portion; and a battery tray having a mounting surface on which the battery is configured to be mounted from above, the battery tray being attachable to the battery accommodating portion in a second direction opposite the first direction, wherein, in a state where the battery is mounted on the mounting surface, the mounting surface supports the battery such that the battery is movable on the mounting surface between:

a first position, the battery at the first position being placed in a first posture; and a second position, the battery at the second position being placed in a second posture, wherein the battery at the second position is positioned further in the second direction relative to the battery at the first position, wherein the battery terminal on the battery in the second posture is positioned further downward relative to the battery terminal on the battery in the first posture, wherein the plurality of walls further comprises a pressing portion, and wherein, during an attachment process of the battery tray to the battery accommodating portion, the pressing portion presses the battery at the second position in the first direction to move the battery to the first position and place the battery in the first posture such that the battery terminal contacts the contact terminal from below.

* * * * *